United States Patent
Sorensen et al.

(10) Patent No.: US 11,266,070 B2
(45) Date of Patent: Mar. 8, 2022

(54) CONVEYOR BELT TENSIONING DEVICE FOR AN AGRICULTURAL MACHINE

(71) Applicant: CNH Industrial America LLC, New Holland, PA (US)

(72) Inventors: Douglas Sorensen, Lancaster, PA (US); Jeff Thomas, Gordonville, PA (US); Joel Cook, Lititz, PA (US); Brian Crow, Rock Island, IL (US)

(73) Assignee: CNH Industrial America LLC, New Holland, PA (US)

(*) Notice: Subject to any disclaimer, the term of this patent is extended or adjusted under 35 U.S.C. 154(b) by 224 days.

(21) Appl. No.: 16/663,539

(22) Filed: Oct. 25, 2019

(65) Prior Publication Data

US 2021/0120741 A1 Apr. 29, 2021

(51) Int. Cl.
*A01D 61/02* (2006.01)
*A01D 41/06* (2006.01)
*B65G 23/44* (2006.01)
*B65H 23/02* (2006.01)

(52) U.S. Cl.
CPC .......... *A01D 61/02* (2013.01); *A01D 41/06* (2013.01); *B65G 23/44* (2013.01); *B65H 23/02* (2013.01)

(58) Field of Classification Search
CPC ........ A01D 61/02; A01D 41/06; A01D 34/00; A01D 57/20; B65G 23/44; B65H 23/02
See application file for complete search history.

(56) References Cited

U.S. PATENT DOCUMENTS

| | | | | |
|---|---|---|---|---|
| 808,122 | A * | 12/1905 | Tanck | B65G 23/44 198/816 |
| 2,631,421 | A * | 3/1953 | Pierce | A01D 57/20 56/14.4 |
| 2,762,183 | A * | 9/1956 | Linscheid | A01D 57/20 56/14.4 |
| 3,436,979 | A * | 4/1969 | Molitor | B65G 23/44 474/138 |
| 3,921,793 | A * | 11/1975 | Hutchinson | B65G 23/44 198/813 |
| 4,421,228 | A * | 12/1983 | Marsiglio | B65G 23/44 198/814 |

(Continued)

FOREIGN PATENT DOCUMENTS

| | | |
|---|---|---|
| EP | 1055361 A1 | 11/2000 |
| EP | 3406129 A1 | 11/2018 |
| KR | 20170004775 A | 1/2017 |

OTHER PUBLICATIONS

Extended European Search Report for EP Application No. 20203960.8 dated Mar. 1, 2021 (six pages).

*Primary Examiner* — Arpad Fabian-Kovacs
(74) *Attorney, Agent, or Firm* — Peter Zacharias; Patrick Sheldrake

(57) ABSTRACT

A header for a combine harvester includes a conveyor belt for conveying crop material in a conveyance direction, and an adjusting device for adjusting a tension of the conveyor belt. The adjusting device includes a link that is movable with respect to a frame member of the header. The link is movable in a direction that is either orthogonal or substantially orthogonal to a tensioning direction of the conveyor belt for adjusting the tension of the conveyor belt. The conveyor belt may be an infeed conveyor belt or a lateral conveyor belt of a draper header, for example.

17 Claims, 6 Drawing Sheets

(56) References Cited

U.S. PATENT DOCUMENTS

| | | | | |
|---|---|---|---|---|
| 4,429,517 | A * | 2/1984 | Lohrentz | A01D 57/20 |
| | | | | 198/314 |
| 4,803,804 | A * | 2/1989 | Bryant | B65G 23/44 |
| | | | | 198/813 |
| 5,984,083 | A * | 11/1999 | Hosch | B65G 23/44 |
| | | | | 198/810.04 |
| 6,202,397 | B1 * | 3/2001 | Watts | A01D 61/002 |
| | | | | 56/14.5 |
| 8,573,388 | B2 | 11/2013 | Hoffman et al. | |
| 8,851,276 | B2 | 10/2014 | Strieker | |
| 9,144,197 | B2 | 9/2015 | Gahres | |
| 10,257,981 | B2 * | 4/2019 | Allochis | B65G 23/44 |
| 10,264,728 | B2 * | 4/2019 | Brimeyer | A01D 57/20 |
| 10,813,282 | B2 * | 10/2020 | Mossman | A01D 34/14 |
| 2005/0045452 | A1 * | 3/2005 | Iseli | B65G 23/44 |
| | | | | 198/813 |
| 2013/0097986 | A1 * | 4/2013 | Lovett | A01D 41/14 |
| | | | | 56/153 |
| 2013/0105282 | A1 | 5/2013 | Hoffman et al. | |
| 2016/0339740 | A1 | 11/2016 | Logan | |
| 2018/0332772 | A1 * | 11/2018 | Fuechtling | A01D 34/04 |
| 2019/0380273 | A1 * | 12/2019 | Mossman | A01D 57/20 |

\* cited by examiner

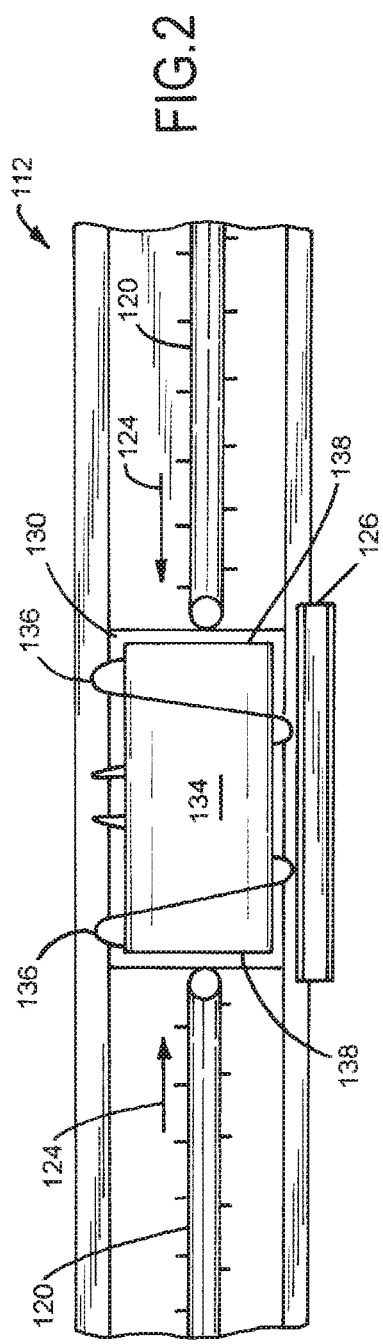
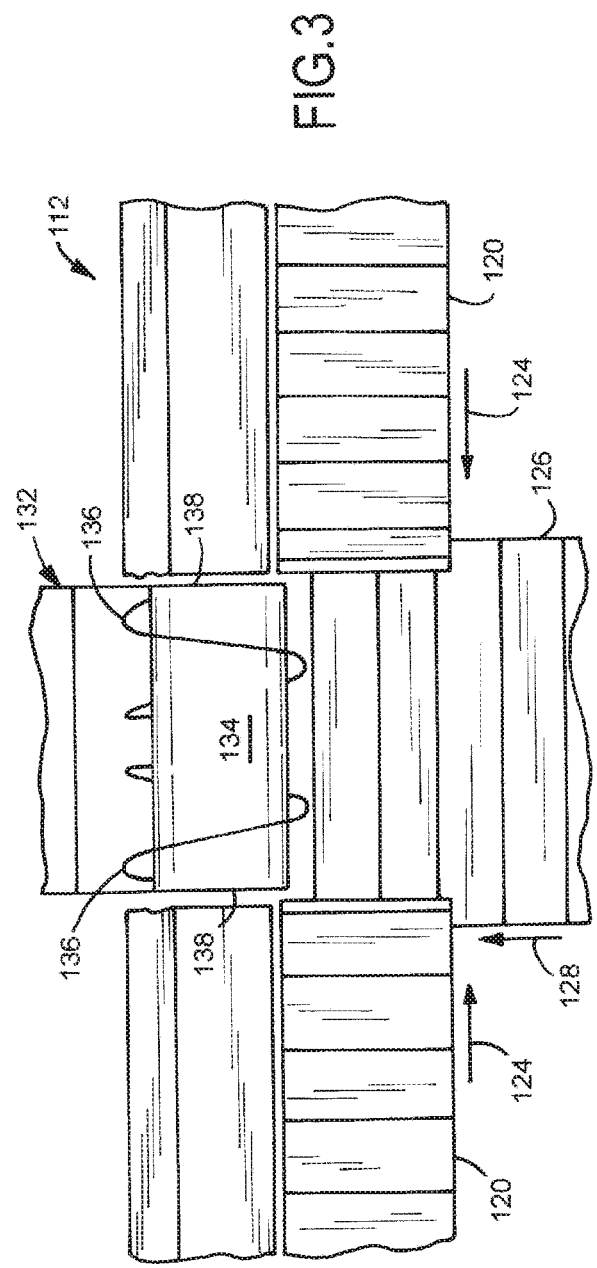

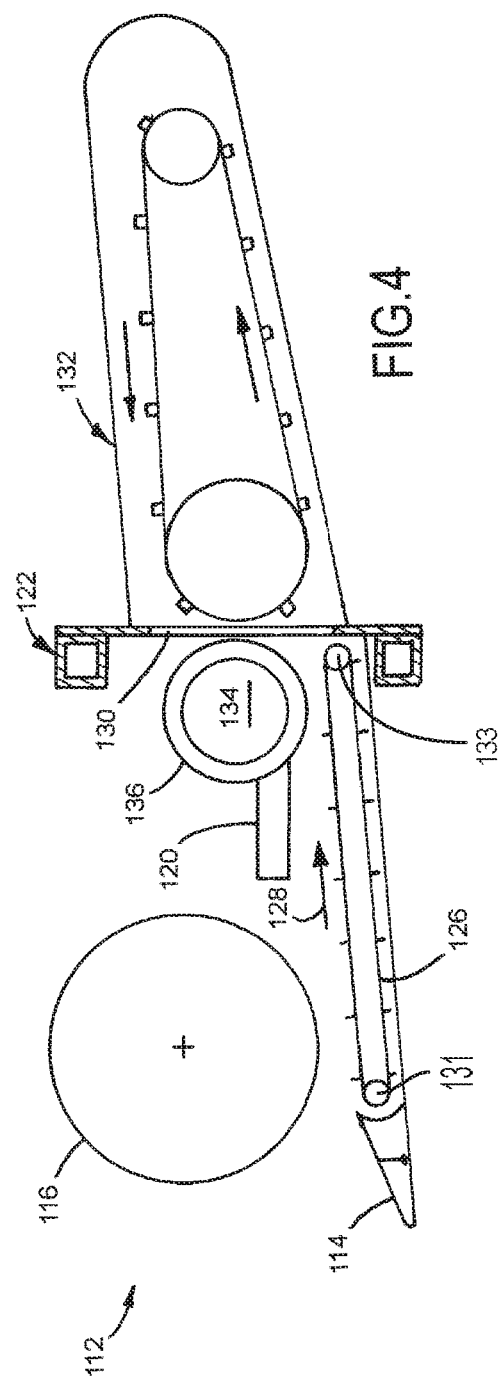

CONVEYOR BELT TENSIONING DEVICE FOR AN AGRICULTURAL MACHINE

FIELD OF THE INVENTION

The present invention relates generally to an agricultural machine, such as a combine, and specifically to a header of a combine, and more specifically to a device for tensioning an infeed belt of the header.

BACKGROUND OF THE INVENTION

As is described in U.S. Pat. No. 9,144,197 to CNH America LLC, which is incorporated by reference herein in its entirety and for all purposes, a typical header of an agricultural combine includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, the header may include a rotating reel with tines or the like to sweep the crop material towards the cutter(s). Alternatively, the header may include snouts and row units instead of a rotating reel and cutter bar(s).

A draper header is typically used to harvest fluffy or bushy crop material such as soy beans or canola. A draper header generally includes a conveyor that is in the form of one or more flat belts, known as draper belts, to convey the crop material to the feeder housing. Typically, a draper header may include two lateral draper belts that convey the crop material longitudinally inward and a center feed belt that conveys the crop material into the feeder housing. Each draper belt may be wrapped around rollers, for example, various combinations of drive rollers and idler rollers. The draper belts may include cleats extending transversely across the full width of the header, which contact the crop material to help facilitate its transportation into the feeder housing.

It can be necessary to adjust the tension on the belts of the header. Current methods for adjusting the tension on the belts are challenging due to difficulties in accessing the belt adjustment components.

Thus, it would be advantageous to provide a convenient and simple method for adjusting the tension on the belt of a draper header of an agricultural vehicle.

SUMMARY OF THE INVENTION

According to one aspect of the invention, a header for a combine harvester includes a conveyor belt for conveying crop material in a conveyance direction, and an adjusting device for adjusting a tension of the conveyor belt. The adjusting device includes a link that is movable with respect to a frame member of the header. The link is movable in a direction that is either orthogonal or substantially orthogonal to a tensioning direction of the conveyor belt for adjusting the tension of the conveyor belt. The adjusting device may also be used with lateral belts on the header. The lateral belts are disposed laterally of the conveyor belt.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a partial schematic front elevation view of a header for an agricultural harvester.

FIG. 3 is a partial schematic top plan view of the header of FIG. 2.

FIG. 4 is a schematic elevational cross-section view taken along a centerline of the header.

DETAILED DESCRIPTION OF THE INVENTION

Figure 1:
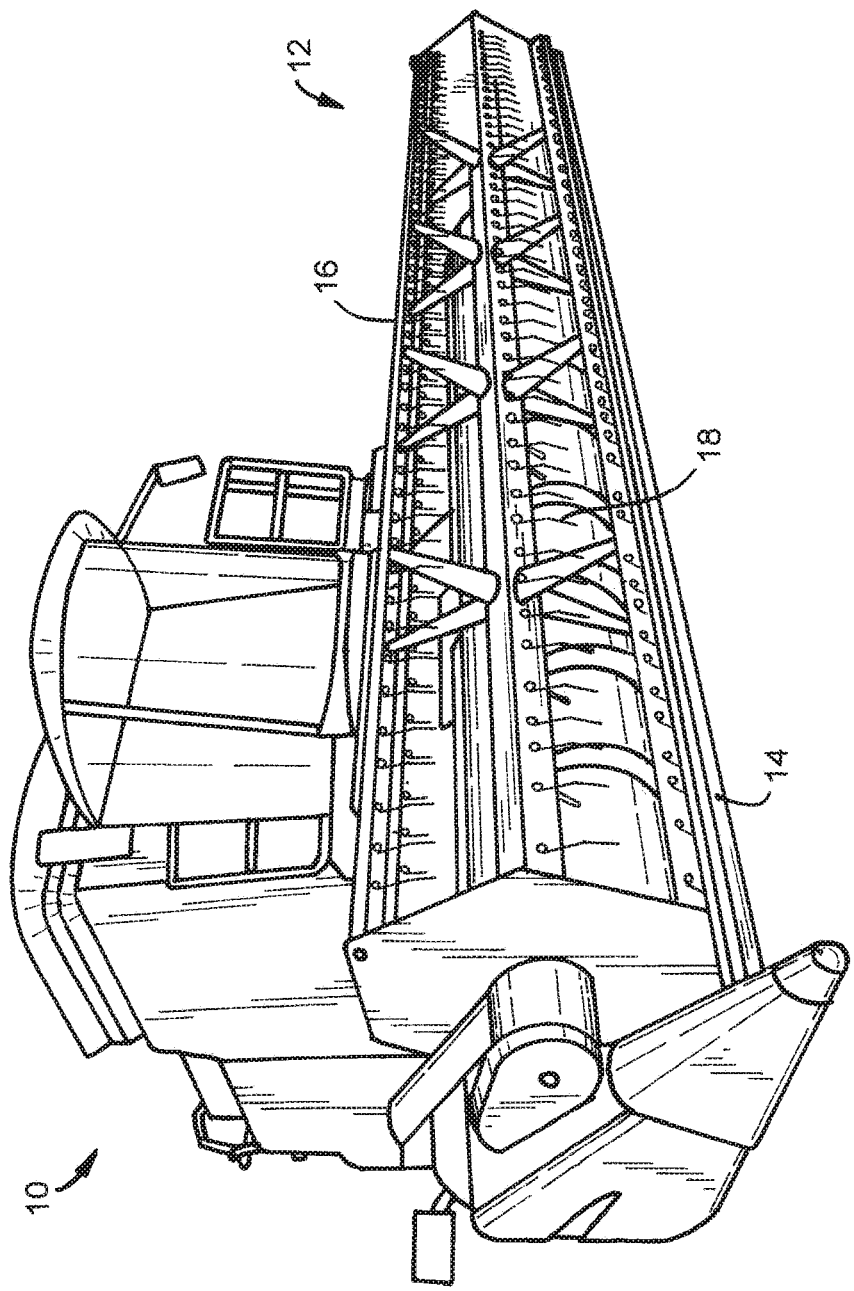
FIG. 1 is a perspective view of an agricultural harvester including a header.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, as is described in U.S. Pat. No. 9,144,197, FIG. 1 illustrates an agricultural harvester applicable to the subject application in the form of a combine harvester 10 to which is attached a header 12. The header 12 has a crop cutter or knife assembly 14 arranged close the ground. The knife assembly can include a stationary blade and a reciprocating blade which together act as shears that cut the crop near the ground. A harvesting reel 16 having tines 18 rotates about a horizontal axis adjacent to the knife assembly 14 to gather the cut crop and feed it into unillustrated processing machinery of the harvester.

Turning to FIGS. 2 through 4, there are shown several views of a draper header 112 for use with the combine harvester 10 in place of the header 12. The header 112 includes a crop cutter and harvesting reel 116 (FIG. 4) followed rearwardly by a crop or grain conveyor system. The harvesting reel 116 gathers the crop cut by the crop cutter 114 and delivers the cut crop to a conveyor system. The conveyor system typically includes a header conveyor constructed as a pair of opposed, laterally extending conveyors 120 which extend from the lateral ends of the header frame or chassis 122 (shown in cross-section in FIG. 4) toward a generally central region of the chassis. As indicated by arrows 124 of FIGS. 2 and 3, cut crop is delivered by conveyors 120 toward a centrally located infeed conveyor 126. Infeed conveyor 126 may also be referred to herein as a belt or conveyor belt. Infeed conveyor 126 extends substantially perpendicular to conveyors 120 and is driven by a belt drive shaft 131 to move crop in the direction of arrows 128 toward an outlet 130 (FIGS. 2 and 4) which leads to a feederhouse 132. As seen in FIGS. 2 through 4, before reaching outlet 130, the cut crop first encounters a centrally located rotatable infeed auger 134 which impels the crop or grain through the outlet 130. More specifically, the cut crop is engaged by the helical vanes or flights 136 of the infeed auger 134 and is pushed thereby through outlet 130.

Figure 6:
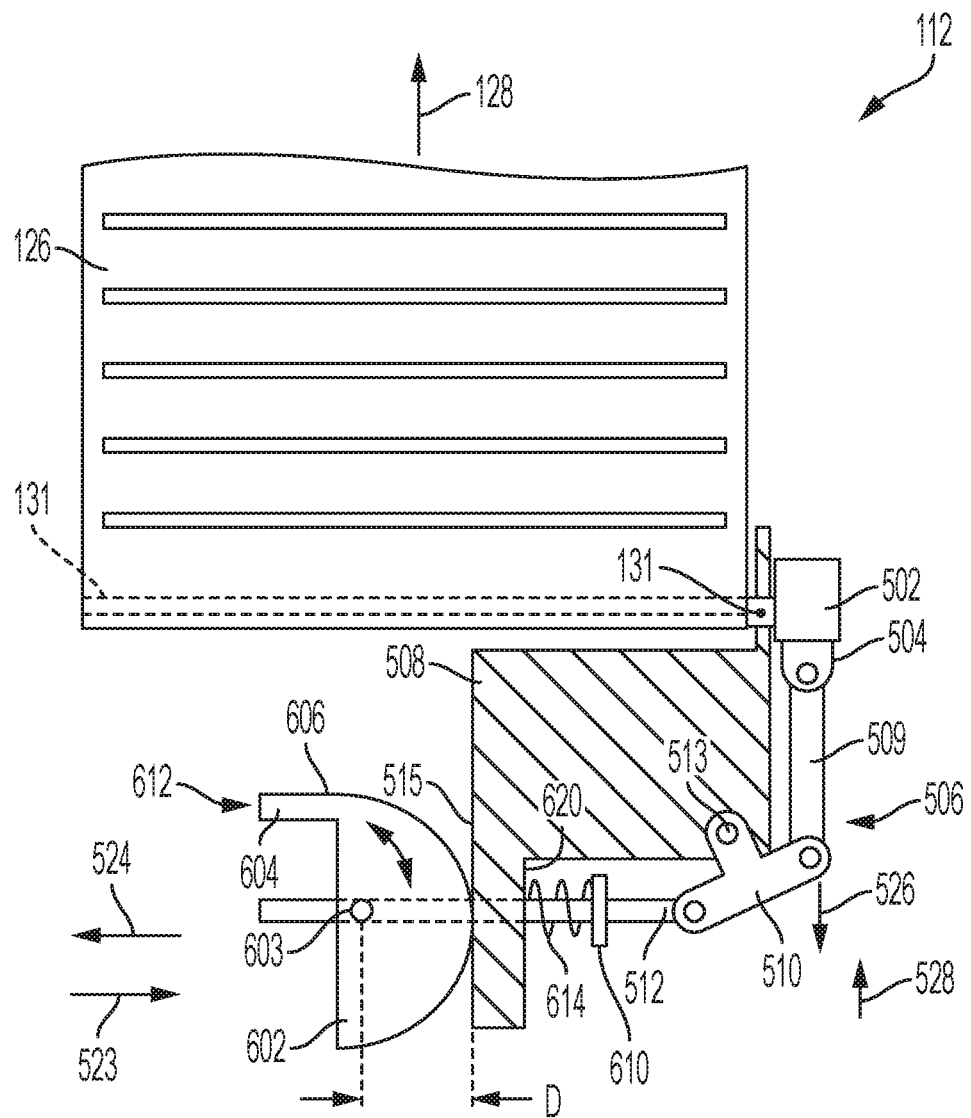
FIG. 6 is a partial schematic top plan view of the header of FIG. 2 according to another example of the invention.
Figure 7:
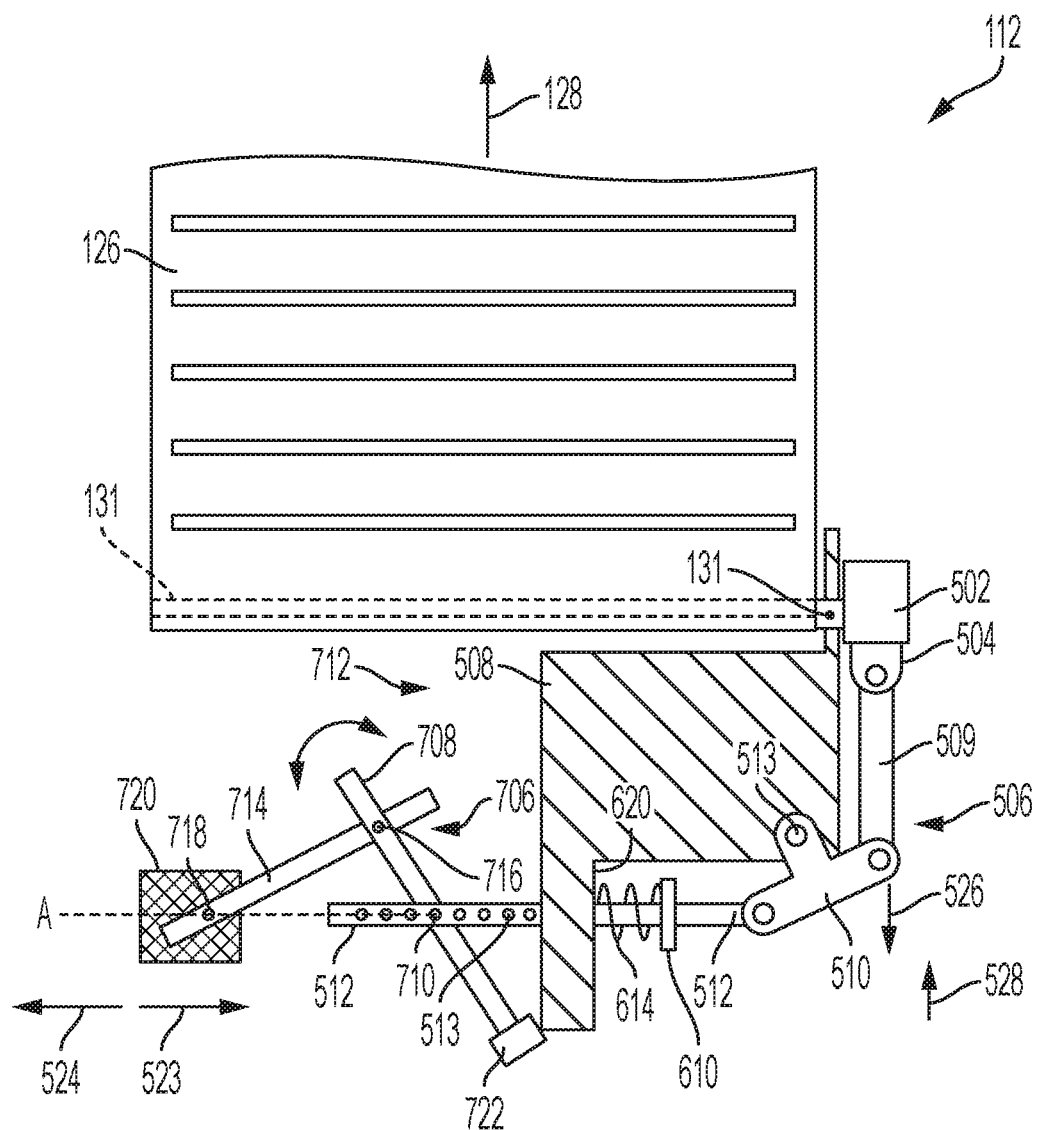
FIG. 7 is a partial schematic top plan view of the header of FIG. 2 according to yet another example of the invention.

It has been observed that conventional infeed conveyors suffer certain disadvantages. As noted above, it can be necessary to adjust the tension on the conventional infeed conveyor. Current methods for adjusting the tension on a conventional infeed conveyor are challenging due to difficulties in accessing the belt adjustment components. The devices shown in FIGS. 5-7 are effective in remedying those difficulties.

Figure 5:
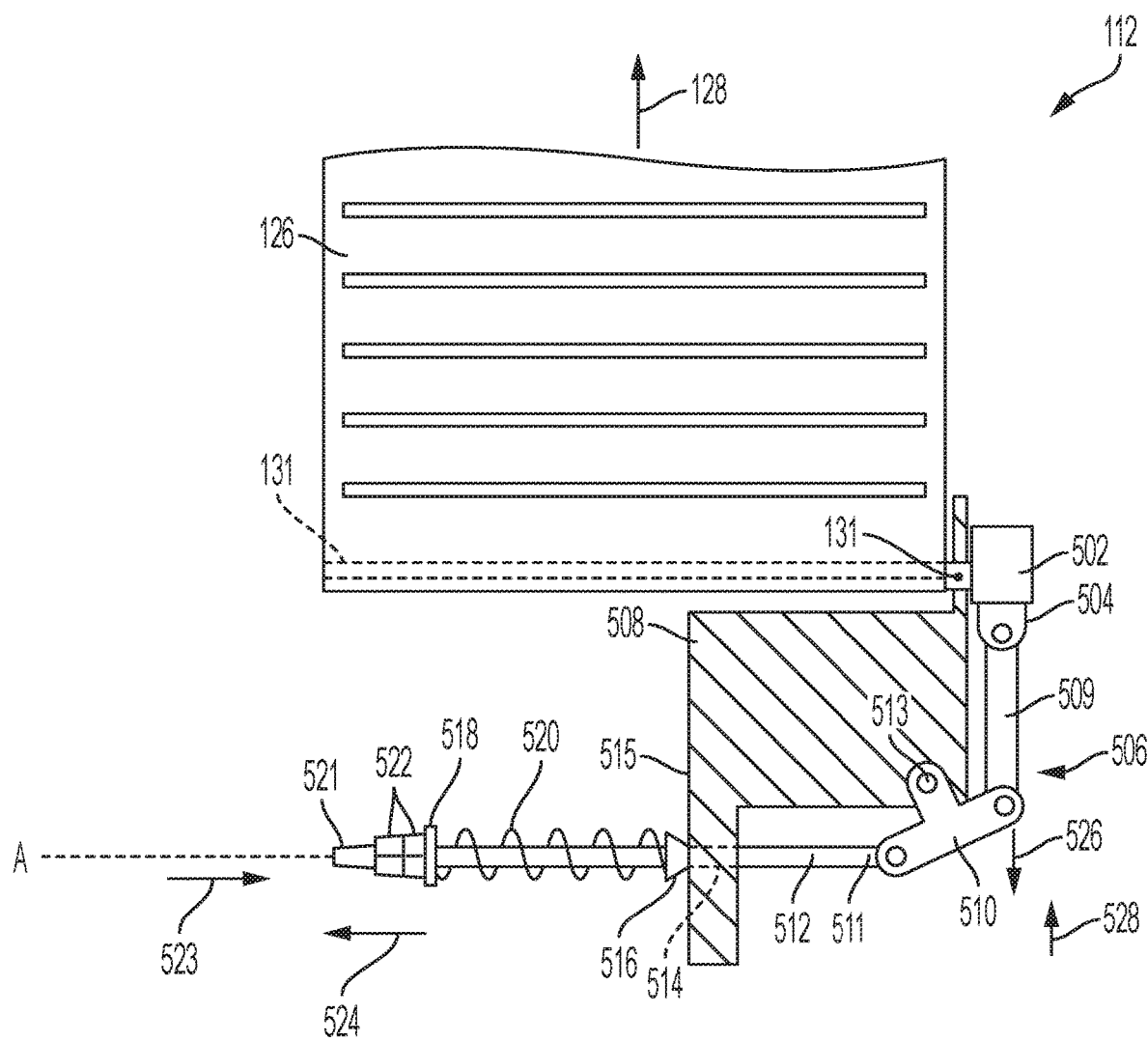
FIG. 5 is another partial schematic top plan view of the header of FIG. 2.

FIG. 5 is another partial schematic top plan view of the header of FIG. 2. FIG. 5 depicts the infeed conveyor 126, which is moved in the direction of arrow 128 by a belt drive shaft 133. The other end of the infeed conveyor 126 is wrapped around a belt idler shaft 131. The belt idler shaft 131 may extend along the entire width of the conveyor 126, as shown. Alternatively, the shaft 131 may extend along only a portion of the conveyor 126. The end of the shaft 131 is journaled in a bearing 502. Bearing 502 has an integral flange 504 extending therefrom or bearing 502 is in a housing. A linkage 506 is connected between flange 504 of bearing 502 and a frame member 508 of header 112. Frame member 508 is a stationary component of header 112, and may comprise more than one stationary component. More particularly, frame member 508 is stationary at least with respect to the belt of the infeed conveyor 126. The infeed conveyor 126 may be able to pivot with respect to the frame of the header.

Linkage 506 comprises a first link 509 that is pivotably connected to flange 504 by a pinned connection. The opposite end of first link 509 is pivotably connected to one leg of a joint 510 by a pinned connection. Joint 510 forms part of linkage 506, and may be referred to in the art as a clevis. A proximal end 511 (i.e., proximal to joint 510) of a second link 512 is pivotably connected to another leg of joint 510 by a pinned connection. A third leg of joint 510 is pivotably connected to frame member 508 by a pinned connection 513.

Second link 512 of linkage 506 passes through an opening 514 formed in frame member 508 and is configured to translate within opening 514, as will be described later. A conical washer 516 is slideably positioned over link 512. Link 512 is capable of translating with respect to conical washer 516. Conical washer 516 includes a conical end that faces and engages with opening 514 on a side 515 of frame member 508. It should be understood that washer 516 is not fixed to frame member 508 or link 512. A flat washer 518 is also slideably positioned over link 512 and is spaced at a distance from conical washer 516. A compression spring 520 is positioned over link 512 and between conical washer 516 and flat washer 518. It should be understood that link 512 is positioned through opening 514, washers 516 and 518, and compression spring 520. The distal end 521 of link 512 is threaded for receiving two threaded fasteners 522 (e.g., nuts).

Those skilled in the art will recognize that other fastening arrangements exist other than nuts and threads. For example, link 512 may include a series of holes staggered along its length and perpendicular to the longitudinal axis "A" for receiving one or more pins therethrough. As another alternative, a clamp may be mounted to the outer diameter of link 512. As another alternative, link 512 may include a series of holes staggered along its length and perpendicular to the longitudinal axis "A" for receiving one or more threaded screws.

Referring still to FIG. 5, adjusting the position of the fasteners 522 changes the tension on conveyor belt 126. For example, moving the fasteners 522 further toward frame member 508 (in the direction of arrow 523) causes compression of spring 520, which causes the link 512 to translate in the direction of arrow 524, which causes joint 510 to rotate about pinned connection 513 in a clockwise direction, which causes link 509 to translate in the direction of arrow 526, which causes bearing 502 and shaft 131 to move in the direction of arrow 526. Movement of shaft 131 in the direction of arrow 526 increases the tension on conveyor belt 126. Link 509 pulls on the center axis of bearing 502, which limits a moment being applied to bearing 502 and shaft 131. Unlike conventional belt tensioning systems, spring 520 and link 512 translate or move in a direction that is perpendicular or substantially perpendicular to the direction 526 of belt tensioning. Stated differently, spring 520 and link 512 translate in a transverse direction with respect to the combine.

Conversely, moving the fasteners 522 further away frame member 508 (in the direction of arrow 524) causes expansion of spring 520, which causes the link 512 to translate in the direction of arrow 523, which causes joint 510 to rotate about pinned connection 513 in a counterclockwise direction, which causes link 509 to translate in the direction of arrow 528, which causes bearing 502 and shaft 131 to move in the direction of arrow 528. Movement of shaft 131 in the direction of arrow 528 decreases the tension on conveyor belt 126.

A user accessible cover (not shown) may be provided on an exterior surface of header 122 for accessing the fasteners 522. The position of fasteners 522 is readily accessible to an operator of header 122, unlike conventional belt tensioning systems.

FIG. 6 is a partial schematic top plan view of header 612 according to another example of the invention. Header 612 is substantially similar to header 112 and only the differences therebetween will be described hereinafter. In header 612, tensioning of conveyor belt 126 is accomplished by linkage 506 in conjunction with a cam device 602. More particularly, cam device 602 is positioned over the link 512 and can rotate with respect to link 512 about a pinned connection 603. Cam device 602 includes a flange 604. Although not shown, a linkage or other device may be mounted to flange 604 (or another point on cam device 602) for rotating cam device 602 in the direction of the arrows with respect to frame member 508. Cam device 602 includes a rounded cam surface 606 for engaging with flat surface 515 of frame member 508. In use, rotation of cam device 602 about pinned connection 603 changes the distance "D" separating pinned connection 603 and surface 515. Although not shown, cam device 612 includes a slot so that it can contact surface 515 of frame member 508 without interfering with link 512. A washer 610 is fixedly mounted to link 512 (or may be integrated with link 512). A compression spring 614 is mounted between one side of washer 610 and a surface 620 of frame member 508. Spring 614 is configured to cause cam surface 606 to bear on surface 515 of frame member 508.

Cam device 602 is shown in a position where it applies maximum tension to conveyor belt 126. In operation, rotating cam device 602 in either a clockwise or counterclockwise direction from its position shown in FIG. 6 causes expansion of spring 614, which causes the link 512 to translate in the direction of arrow 523, which causes joint 510 to rotate about pinned connection 513 in a counterclockwise direction, which causes link 509 to translate in the direction of arrow 528, which causes bearing 502 and shaft 131 to move in the direction of arrow 528. Movement of shaft 131 in the direction of arrow 528 decreases the tension on conveyor belt 126.

Rotating cam device 602 back to its position shown in FIG. 6 causes compression of spring 614, which causes the link 512 to translate in the direction of arrow 524, which causes joint 510 to rotate about pinned connection 513 in a clockwise direction, which causes link 509 to translate in the direction of arrow 526, which causes bearing 502 and shaft 131 to move in the direction of arrow 526. Movement of shaft 131 in the direction of arrow 526 increases the tension on conveyor belt 126. Unlike conventional belt tensioning systems, spring 614 and link 512 translate or move in a direction that is perpendicular or substantially perpendicular to the direction 526 of belt tensioning.

FIG. 7 is a partial schematic top plan view of header 712 according to yet another example of the invention. Header 712 is also substantially similar to header 112 and only the differences therebetween will be described hereinafter. Header 712 also includes elements of header 612, namely, spring 614 and washer 610. In header 712, tensioning of conveyor belt 126 is accomplished by linkage 506 in conjunction with a second linkage 706. Linkage 706 is an over-the-center type linkage that includes a first link 708 that is pivotably connected to link 512 by a pinned connection 710. A second link 714 is pivotably connected to link 708 by a pinned connection 716. Second link 714 is also pivotably connected to frame member 720 by a pinned connection 718. Frame member 720 is stationary and may form part of frame member 508. Regardless, frame members 508 and 720 represent substantially stationary and fixed points on the combine.

The over-the-center type linkage 706 has two states, namely, a locked state (not shown) in which the link 512 is locked in position and a pre-determined amount of tension is applied to the conveyor belt 126, and an unlocked state (shown) in which the link 512 is not locked in position and the tension on the conveyor belt 126 is released. The link 708 is pivotable along the directions of the curved arrow to move the linkage 706 between the locked and unlocked states. The link 512 may have multiple openings 713 through which the pin 710 is selectively positionable to adjust the resultant tension on the belt 126 in the locked state of the linkage 706. Alternatively, the link 708 may have holes.

In operation, starting from the unlocked state of the linkage 706 shown in FIG. 7, the pin 710 is first inserted through an existing hole in the link 708 and one of the holes 513 in the link 512 in order to achieve a desired degree of tension on the belt 126 once the linkage 706 is moved to the locked state. Selecting a hole 513 further to the right of the pin 710 shown in FIG. 7 will act to increase the degree of tension on the belt 126 once the linkage 706 is moved to the locked state. Conversely, selecting a hole 513 further to the left of the pin 710 shown in FIG. 7 will act to increase the degree of tension on the belt 126 once the linkage 706 is moved to the locked state The operator then rotates the handle 722 of link 708 in a clockwise direction from its unlocked position shown in FIG. 7, which causes compression of spring 614, which causes the link 512 to translate in the direction of arrow 524 and along axis A, which causes joint 510 to rotate about pinned connection 513 in a clockwise direction, which causes link 509 to translate in the direction of arrow 526, which causes bearing 502 and shaft 131 to move in the direction of arrow 526. Movement of shaft 131 in the direction of arrow 526 increases the tension on conveyor belt 126. The link 708 ultimately comes to rest in a substantially horizontal position that is substantially parallel to the link 512 (or slightly angled with respect to link 512). The linkage 706 is then substantially locked in position and the belt 126 is maintained in a state of tension. Unlike conventional belt tensioning systems, spring 614 and link 512 translate or move in a direction that is perpendicular or substantially perpendicular to the direction 526 of belt tensioning.

To release or unlock the tension on the belt 126, the operator rotates the handle of 722 of link 708 in a counterclockwise direction back to the position shown in FIG. 7, which causes expansion of spring 614, which causes the link 512 to translate in the direction of arrow 523 and along axis A, which causes joint 510 to rotate about pinned connection 513 in a counterclockwise direction, which causes link 509 to translate in the direction of arrow 528, which causes bearing 502 and shaft 131 to move in the direction of arrow 528. Movement of shaft 131 in the direction of arrow 528 decreases the tension on conveyor belt 126. Tension is then released on the belt 126.

Described herein are means for moving the link 512 that are directly connected to said link 512. The means may comprise the fasteners 522, the cam 606, the linkage 706, or any other mechanism that can be employed to move a link.

Although not shown, a motor or other motive device could be configured to move the fasteners 522, cam device 602 or the linkage 706 to adjust the tension of the conveyor belt 126.

In light of all the foregoing, it should thus be apparent to those skilled in the art that there has been shown and described a device for adjusting the tension of an infeed belt of a header of a combine harvester. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A header for a combine harvester comprising:
 a conveyor belt for conveying crop material in a conveyance direction;
 an adjusting device for adjusting a tension of the conveyor belt, the adjusting device comprising a first link that is movable with respect to a frame of the header, wherein the first link is movable in a direction that is either orthogonal or substantially orthogonal to a tensioning direction of the conveyor belt for adjusting the tension of the conveyor belt,
 wherein the adjusting device is a linkage, and the linkage comprises the first link, a second link, and a joint that is pivotably coupled to both the first link and the second link, wherein the joint is pivotably mounted to the frame, and the second link is attached to a shaft that rotates with the conveyor belt, and wherein translation of the first link causes rotation of the joint, which causes translation of the second link, which causes translation of the shaft that rotates with the conveyor belt, which results in tensioning of the conveyor belt, wherein the linkage further comprises a spring that is configured to bias the first link in order to maintain the conveyor belt in a state of tension, wherein the first link passes through an opening in a wall of the frame, and the spring and the joint are positioned on opposite sides of the wall.

2. The header of claim 1, wherein the tensioning direction and the conveyance direction of the conveyor belt are both in the fore-aft direction of the combine harvester.

3. The header of claim 1, wherein the first link extends along an axis that is either orthogonal or substantially orthogonal to a tensioning direction of the conveyor belt.

4. The header of claim 1, wherein the conveyor belt is an infeed conveyor belt and the header is a draper header.

5. The header of claim 4, wherein the infeed conveyor belt is oriented orthogonal to a lateral conveyor belt of the draper header.

6. The header of claim 1, wherein the conveyance direction is toward a feederhouse.

7. The header of claim 1, wherein the conveyor belt is a lateral conveyor belt and the header is a draper header.

8. The header of claim 1, wherein the first link is either directly or indirectly connected to the shaft that rotates with the conveyor belt.

9. The header of claim 1, further comprising a fastener mounted to the first link for adjusting a compression of the spring, which adjusts the state of tension of the conveyor belt.

10. The header of claim 9, wherein the fastener is at least one nut that is mounted to a threaded portion of the first link.

11. The header of claim 1, further comprising means for moving the first link that are directly connected to said first link.

12. A combine harvester or other agricultural machine comprising the header of claim 1.

13. A header for a combine harvester comprising:
a conveyor belt for conveying crop material in a conveyance direction;
an adjusting device for adjusting a tension of the conveyor belt, the adjusting device comprising a first link that is movable with respect to a frame of the header, wherein the first link is movable in a direction that is either orthogonal or substantially orthogonal to a tensioning direction of the conveyor belt for adjusting the tension of the conveyor belt, wherein the adjusting device is a linkage, and the linkage comprises the first link, a second link, and a joint that is pivotably connected to the second link and a first end of the first link, wherein the joint is pivotably mounted to the frame, and wherein the second link is attached to a shaft that rotates with the conveyor belt, and
a cam device having a cam surface that is positioned against the frame and wherein the cam device is pivotable and is pivotably coupled to a second end of the first link to adjust a position of the first link, and wherein rotation of the cam against the frame causes translation of the first link, which causes rotation of the joint, which causes translation of the second link, which causes translation of the shaft that rotates with the conveyor belt, which results in tensioning of the conveyor belt.

14. The header of claim 13 further comprising a spring mounted to the first link, and wherein the cam device is pivotable against a bias of the spring.

15. A header for a combine harvester comprising:
a conveyor belt for conveying crop material in a conveyance direction; and
an adjusting device for adjusting a tension of the conveyor belt, the adjusting device comprising a first link that is movable with respect to a frame of the header, wherein the first link is movable in a direction that is either orthogonal or substantially orthogonal to a tensioning direction of the conveyor belt for adjusting the tension of the conveyor belt, wherein the adjusting device is a linkage, and the linkage comprises the first link, a second link, and a joint that is pivotably connected to the second link and a first end of the first link, wherein the joint is pivotably mounted to the frame, and wherein the second link is attached to a shaft that rotates with the conveyor belt,
wherein the linkage is an over-the-center linkage that further comprises a third link that is pivotably coupled to the first link, a fourth link that is pivotably coupled to the third link and the frame, wherein rotation of the third link causes movement of the first link, which locks the tension of the conveyor belt.

16. The header of claim 15, further comprising a spring mounted to the first link, and wherein the linkage is pivotable against a bias of the spring.

17. The header of claim 15, wherein the third link includes a plurality of openings, and the fourth link is connected to one of the plurality openings by a pin.

* * * * *